US007966047B2

(12) United States Patent
Demuynck (10) Patent No.: US 7,966,047 B2
(45) Date of Patent: Jun. 21, 2011

(54) WIRELESS TERMINALS WITH INTEGRATED HIGH SPEED SERIAL COMMUNICATION HINGES

(75) Inventor: Randolph Cary Demuynck, Wake Forest, NC (US)

(73) Assignee: Sony Ericsson Mobile AB, Lund (SE)

( * ) Notice: Subject to any disclaimer, the term of this patent is extended or adjusted under 35 U.S.C. 154(b) by 912 days.

(21) Appl. No.: 11/761,539

(22) Filed: Jun. 12, 2007

(65) Prior Publication Data

US 2008/0311962 A1    Dec. 18, 2008

(51) Int. Cl.
*H04M 1/00* (2006.01)
(52) U.S. Cl. ........... 455/575.1; 455/575.3; 455/575.8
(58) Field of Classification Search ........... 455/550.1, 455/566, 575.1–575.8
See application file for complete search history.

(56) References Cited

U.S. PATENT DOCUMENTS

| 6,356,160 | B1 * | 3/2002 | Robinson et al. ........... 331/17 |
| 2002/0186213 | A1 * | 12/2002 | Koizumi ........... 345/208 |
| 2003/0123232 | A1 * | 7/2003 | Huang et al. ........... 361/751 |
| 2006/0071863 | A1 | 4/2006 | Lindell |
| 2006/0142072 | A1 | 6/2006 | Krenz et al. |
| 2006/0188254 | A1 | 8/2006 | Schorpp |
| 2007/0001005 | A1 | 1/2007 | White et al. |
| 2007/0032275 | A1 * | 2/2007 | Suzuki et al. ........... 455/575.3 |

FOREIGN PATENT DOCUMENTS

| EP | 1148406 A2 | 10/2001 |
| WO | WO 2005/069585 A1 | 7/2005 |
| WO | WO 2007/024409 A1 | 3/2007 |

OTHER PUBLICATIONS

International Search Report and Written Opinion for PCT/US2008/000120, Mail Date Jun. 30, 2008.
Kuroda, Tadahiro "EE29OC, University of California, Berkeley, Lecture 6: CMOS Proximity Wireless Communications for 3D Integration" 48 pages (2007—exact date unknown but *before* filing date of Jun. 12, 2007) <http//bwrc.eece.Berkeley.edu/Classes/ee290c/s07/index.html.com> (*Lecture 6*).

* cited by examiner

*Primary Examiner* — Dai A Phuong
(74) *Attorney, Agent, or Firm* — Myers Bigel Sibley & Sajovec (57) ABSTRACT

The disclosure describes wireless terminals with first and second members held together by a hinge assembly with high-speed serial communication serial data transmission paths that extend through the hinge assembly.

13 Claims, 8 Drawing Sheets

WIRELESS TERMINALS WITH INTEGRATED HIGH SPEED SERIAL COMMUNICATION HINGES

FIELD OF THE INVENTION

The present invention relates to the field of communications, and, more particularly, to wireless terminals incorporating the same.

BACKGROUND OF THE INVENTION

Wireless terminals, such as wireless mobile telephones can include flip members. Conventionally, data transfer connections between the upper (flip) and lower (base) members have been provided via flex circuits, such as those wrapped within a hinge.

SUMMARY OF THE INVENTION

Embodiments of the present invention provide data transfer between two-piece wireless terminals using an electronic coupling integrated in a hinge assembly.

Some embodiments are directed to wireless terminals that include: (a) a first housing member including a circuit in communication with a first serial communications data path; (b) a second housing member attached to the first member, the second housing member including a first serial communications data path; and (c) a hinge assembly attached to the first and second housing members to allow the first and second housing members to pivot between open and closed configurations. The hinge assembly includes a first electrical coupler that couples the first serial communications data path in the first housing member to the first serial communications data path in the second housing member to allow data transfer therebetween.

Some embodiments are directed to wireless terminals that include: (a) a first housing member including at least one communications data path; (b) a second housing member attached to the first member, the second housing member including at least one communications data paths; and (c) a hinge assembly attached to the first and second housing members to allow the first and second housing members to pivot between open and closed configurations. The hinge assembly inductively couples the least one communications data path in the first housing member to the corresponding communications data path in the second housing member whereby the inductive coupling allows communications data transfer.

In some particular embodiments, the first and second housing members comprise a circuit with any serial communications interface, such as, for example, a serial to parallel conversion CMOS circuit. The hinge assembly may include a first cooperating pair of inductors and a second cooperating pair of inductors, one for each of the first and second transmission paths. The inductors may have a diameter of between about 1 Î¼m to about 10 mm.

Still other embodiments are directed to methods of transferring data between a base and flip member of a radiotelephone. The methods include: (a) transmitting data along a first serial data transmission paths in a base member of a radiotelephone to a hinge assembly holding the base and flip members together; and (b) transferring the serial data from the base member to a corresponding first serial data transmission path in a flip member via an inductive coupler in the hinge assembly to carry out high-speed serial data transfer between data paths in the flip and base members.

The wireless terminal product can include a wireless mobile telephone. It is noted that any of the features claimed with respect to one type of claim, such as a system, apparatus, circuit, method or computer program, may be claimed or carried out as any of the other types of claimed operations or features.

Further features, advantages and details of the present invention will be appreciated by those of ordinary skill in the art from a reading of the figures and the detailed description of the embodiments that follow, such description being merely illustrative of the present invention.

DETAILED DESCRIPTION OF EMBODIMENTS OF THE INVENTION

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. It will be appreciated that although discussed with respect to a certain embodiment, features or operation of one embodiment can apply to others.

Like numbers refer to like elements throughout. In the figures, the thickness of certain lines, layers, components, elements or features and/or regions may be exaggerated for clarity. Broken lines illustrate optional features or operations unless specified otherwise. Features described with respect to one embodiment can also apply to another embodiment.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The term "CMOS" refers to complimentary metal oxide semiconductors. The term "high-speed" refers to data transfer rates that are at least 1 kilobyte/second, and typically between about 0.1 Gigabytes/second to (at least) about 1000 Gigabytes/second, although even higher transfer rates may be achievable. The term "printed circuit board" refers to a substrate of any material whether flexible or rigid, comprising circuit components and traces. The term "coil" when referring to an inductor includes both the discrete physically wound coil configuration and a flat conductor configuration, although the component may be shown schematically for ease of reference in some of the figures. Similarly, the term diameter or reference "D" refers to an inductor shape-related distance, and does not necessarily mean that the inductor is round. The term "wire" is used generally and refers to any conductive extension such as a trace, filar, or conductive wire (if a wire it may be insulated).

As is known to those of skill in the art, the term "serial to parallel conversion circuit" means that the circuit (or sub-circuit) is able to convert a stream of data elements received in time sequence, i.e., one at a time, into a data stream having multiple data elements transmitted simultaneously. The term "parallel to serial conversion circuit" means the circuit can operate in the reverse to covert multiple data elements received simultaneously into a stream of data in time sequence. One type of serial to parallel conversion circuit is embodied in a CMOS circuit, such as those believed are or will be commercially available from STMICROELECTRONICS, Inc, having a place of business in Carrollton, Tex., USA and corporate headquarters in Geneva, Switzerland.

Embodiments of the present invention will be described in detail below with reference to the figures.

Although primarily described with respect to the wireless terminal being a mobile telephone, the invention may be suitable for other wireless terminal devices. As used herein, the term "wireless terminal" may include, but is not limited to, portable radio communication equipment such as a mobile radio terminal, including cellular wireless terminals or mobile telephones with or without a multi-line display; a Personal Communications System (PCS) terminal that may combine a cellular wireless terminal with data processing, facsimile and data communications capabilities; a PDA that can include a wireless terminal internet/intranet access, web browser, pager, organizer, calendar and/or a GPS receiver; pagers; organizers; smartphones; and a conventional laptop and/or palmtop receiver or other appliance that includes a wireless terminal transceiver. Wireless terminals may also be referred to as "pervasive computing" devices and may be mobile terminals. The wireless terminal devices may operate at a single or multiple frequency bands.

Examples of communication protocols that may be carried out by a wireless terminal with a cellular transceiver configured to transmit/receive RF signals in one or more frequency bands that are allocated for cellular communications. Examples of cellular protocols include, but are not limited to, Advanced Mobile Phone Service (AMPS), ANSI-136, Global Standard for Mobile communication (GSM), General Packet Radio Service (GPRS), enhanced data rates for GSM evolution (EDGE), Code Division Multiple Access (CDMA), wideband-CDMA (WCDMA), CDMA2000, Universal Mobile Telecommunications System (UMTS), and/or a Digital Communications System (DCS). In addition, the wireless terminals may include global positioning systems (GPS) or Bluetooth systems use frequencies of 1.575 or 2.4-2.48 GHz. The wireless terminal may employ frequency bands allocated for mobile terminals in North America, such as, for example, 824-894 MHz for Advanced Mobile Phone Service (AMPS) and 1850-1990 MHz for Personal Communication Services (PCS). The wireless terminals can include these and/or other frequency bands for use in other jurisdictions.

Figure 1:
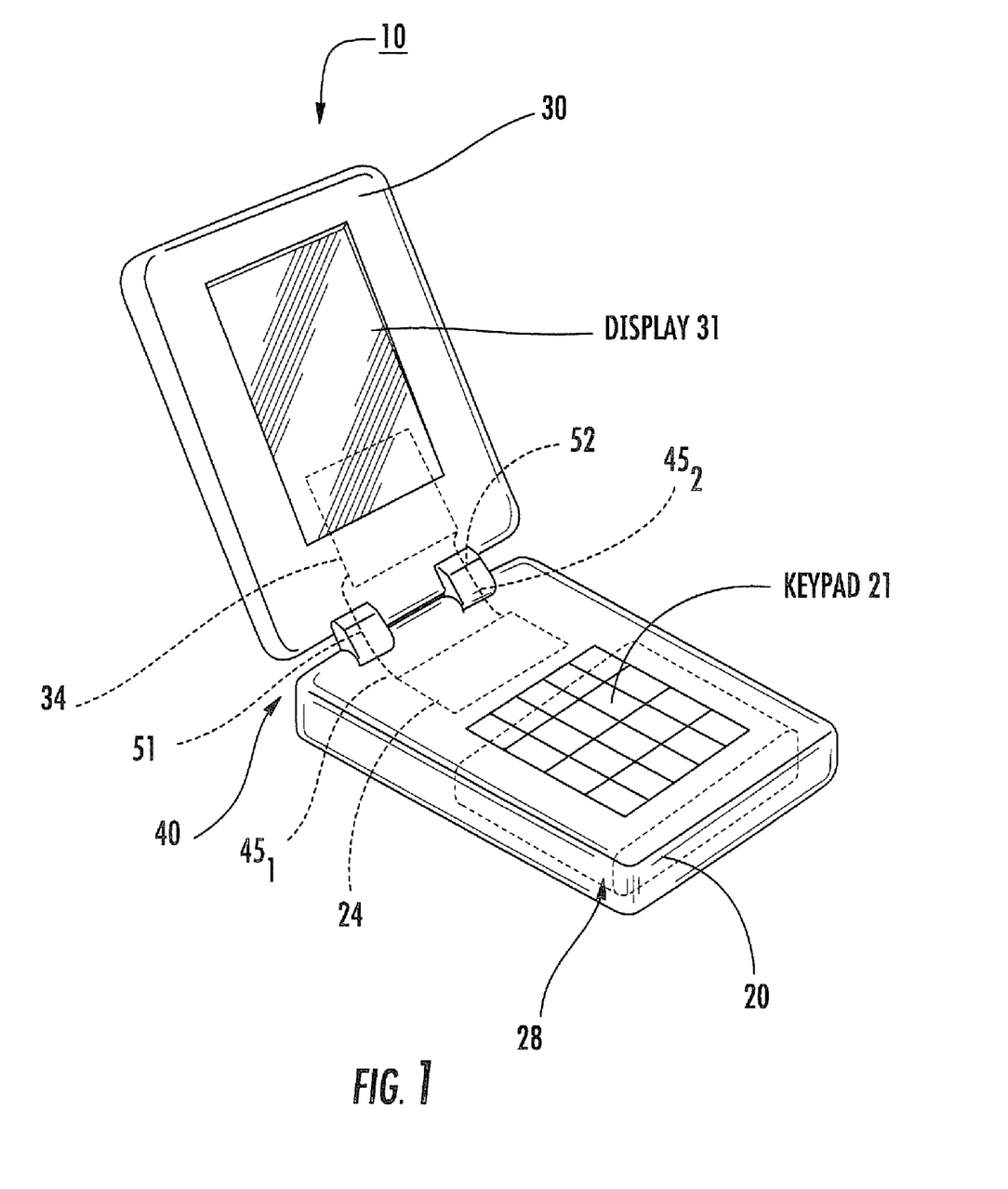
FIG. 1 is a schematic side perspective view of a wireless terminal according to some embodiments of the present invention.

Turning now to the figures, FIG. 1 illustrates an example of a wireless terminal 10. The wireless terminal 10 includes a first member 20 and a second member 30 attached together via a hinge assembly 40 to be able to pivot between open and closed positions. The wireless communication device 10 shown in the figures may be a radiotelephone type radio terminal of the cellular or PCS type. The first member 20 can include a keypad 21 and the second member 30 can include a display 31. The first member 20 can include a printed circuit board assembly 24 with operating components such as a radio-frequency (RF) transceiver and a power source 28 (i.e., a battery). The second member 30 can include a printed circuit board assembly 34 that is typically a flex circuit and can be powered by the power source 28 in the first member 20. The second member circuit 34 and first member circuit 24 cooperate with at least one (shown as two) electrical couplers $45_1$, $45_2$ integrated into, onto and/or with the hinge assembly 40 to define at least one communications data path, shown here as first and second transmit and receive serial communication paths 51, 52, to transport data between electronic components of the first member 20 and the second member 30. Although shown as two serial communications data paths, the invention is not intended to be limited to this configuration as a single data path may alternatively be coupled through the hinge. In other embodiments, it is contemplated that more than two data paths (e.g., 3-20 or even more) with respective electrical couplers integrated into the hinge assembly may be used.

Figure 2:
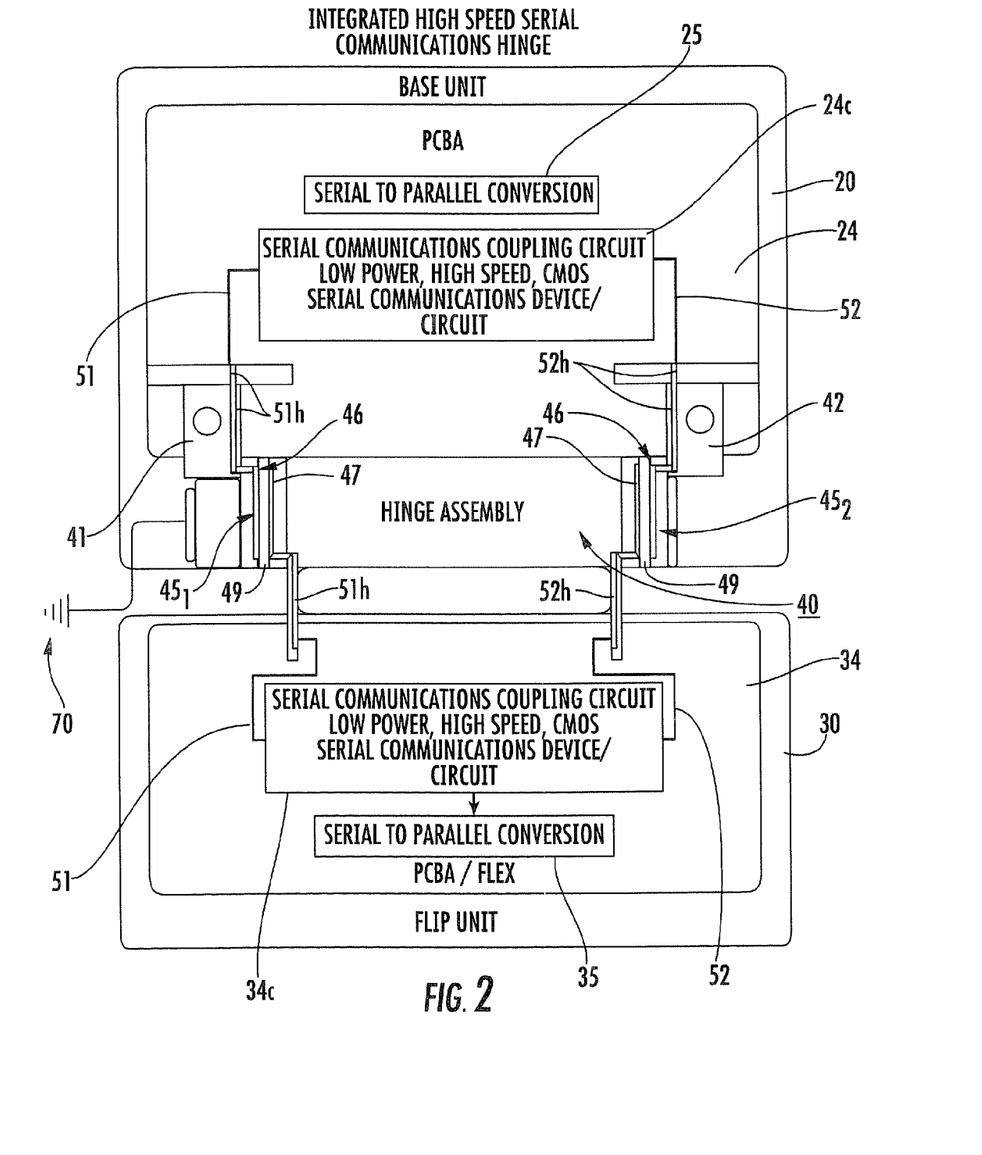
FIG. 2 is an enlarged schematic view of a communications circuit according to embodiments of the present invention.

FIG. 2 is a schematic showing an example of the serial communications circuitry extending on and between the first and second members 20, 30 with the hinge assembly 40 comprising electrical couplers $45_1$, $45_2$ that are laterally spaced apart. At least one of the circuits 24, 34 can include a serial interface circuit of any type, typically included as a CPU. As shown, the data path circuit can include a serial to parallel conversion circuit 25, 35 (shown as one on each member 20, 30) and a coupling drive circuit 24c, 34c. In other embodiments, the circuit can include a SERDES (serializer/deserializer) or other data communications interface (not shown).

Figure 5A:
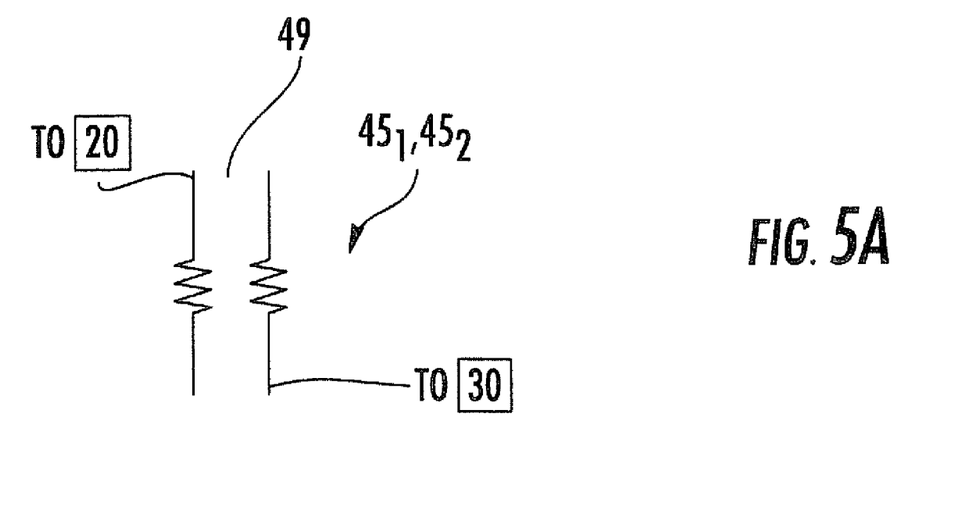
FIGS. 5A and 5B are schematic illustration of alternative electrical coupler configurations according to other embodiments of the present invention.
Figure 5B:
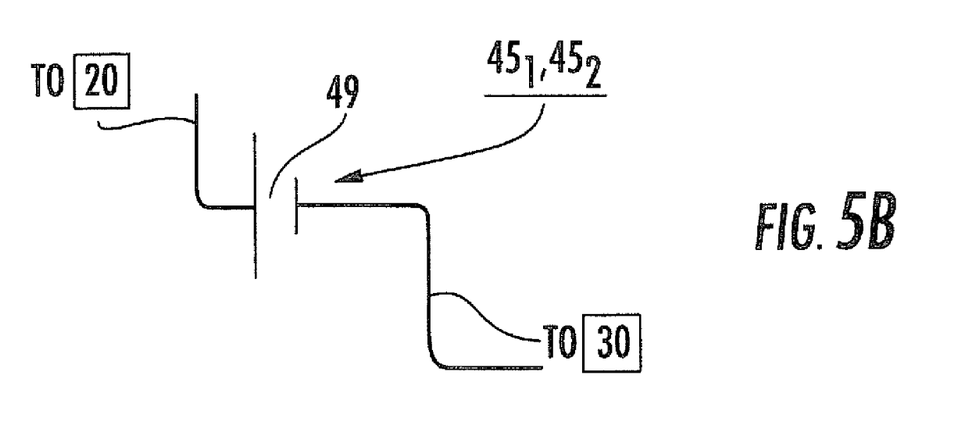

As shown, the electrical data transfer couplers $45_1$, $45_2$ comprise inductors forming at least one inductor pair for inductive coupling. However, other electronic coupler configurations may be used including, for example, one or more of resistive (FIG. 5A), capacitive (FIG. 5B), and/or impedance data transfer coupling configurations, or combinations thereof, as long as such configurations provide a desired data transfer rate with a desired power consumption. It is also noted that the electrical components shown in FIGS. 5A and 5B are shown schematically as the components can be provided using CMOS or other conductor or semiconductor (flat wafer-like) configurations. The data transfer circuitry 24, 34 can operate using "low" power, suitable for satisfactory battery life in a portable communications device, e.g., 4 hours of continuous talk time.

As shown in FIG. 2, the first electrical coupler $45_1$ electrically couples the first serial communications data path 51 in the first (housing) member 20 to the corresponding first high speed serial communications data path 51 in the second (housing) member 30 and the other $45_2$ that electrically couples the second serial communications data path 52 in the first (housing) member 20 to the corresponding second high speed serial communications data path 52 in the second housing member 30. In some embodiments, each coupler $45_1$, $45_2$ can extend through or in a respective outer "knuckle" of a hinge in certain hinge configurations. In other embodiments, the couplers $45_1$, $45_2$ can reside axially spaced apart within and/or on a common (medial or center) part of the hinge body.

In the embodiment shown in FIG. 2, each electrical coupling $45_1$, $45_2$ includes at least two inductors, at least one associated with the respective serial (data transfer) travel path on/in the first member 20 and at least one other associated with the travel path on/in the second member 30. That is, the first inductor coil 46 is in electrical communication with Tx/Rx path 51 on the hinge connector 41 that attaches to the first member 20 while a proximately positioned and cooperating coil 47 is in electrical communication with the corresponding Tx/Rx path 51 held by the second member 30. The two inductors 46, 47 are spaced apart by a thin dielectric 49 and define an inductive (serial communications data transfer) coupling. The dielectric 49 is typically sized to accommodate the desired proximity coupling gap between the opposing coils 46, 47 (or other electrical coupling components). As such, the word "thin" refers to a dielectric that is typically between about 1 μm to about 10 mm.

Still referring to FIG. 2, the first member circuit 24 can have one or more serial paths, shown as two serial paths 51, 52 that branch out from the serial to parallel conversion circuit 25. Each path 51, 52 can include a single trace or multiple traces that extend to traces formed or placed on or in the hinge assembly 40. In some embodiments, the hinge traces 51h, 52h can be aligned to connect up directly to the (main) printed circuit board assembly 24 and the (flip/flex) circuit 34. The hinge traces 51h, 52h typically include at least two traces, one for ground and one for a Tx/Rx line. Alternately, three or more traces may be used, one to a dedicated Tx line, one to a dedicated Rx line and one to ground. That is, the serial paths 51, 52 can be configured with a single trace that can be a combination Tx/Rx path or may have multiple traces, with a dedicated Tx and Rx line. In some embodiments, each path 51, 52 can have a plurality of traces, with at least one of each being a dedicated Tx or Rx path. The serial paths 51, 52 of the first member 20 then travel to traces or paths formed into the respective hinge connector 41, 42, then merge into the respective first inductor 46 held in the hinge cavity. The hinge assembly 40 also holds the relatively closely spaced apart cooperating second inductor 47. The electrical path then merges into the Tx/Rx lines of the corresponding serial path 51, 52 of the second member 30. The serial data from serial lines 51, 52 can be transferred to a serial interface and/or converted to the parallel format via circuit 35. The circuits 24, 34 can be referred to as inductive coupling data transfer circuits that allow the data transfer along the data transfer paths 51 and 52 and can, in some particular embodiments, comprise CMOS circuits.

The hinge assembly 40 can define a ground 70 that can ground one or each electrical coupler $45_1$, $45_2$. In some embodiments, the ground 70 is in communication with only a first inductor 46 of each inductor pair. That is, the hinge assembly 40 can include a conductive body that allows a single ground connection to be operative for one or more data transfer couplers $45_1$, $45_2$.

Figure 3A:
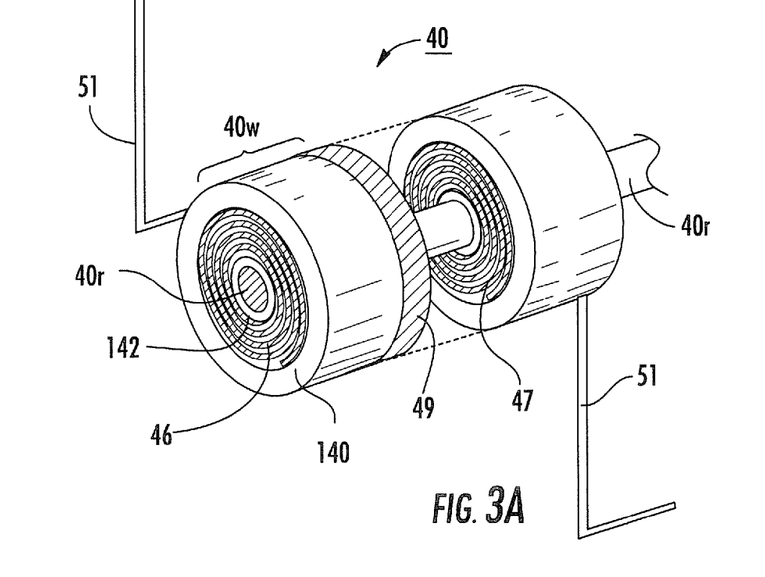
FIG. 3A is an enlarged partial schematic of an exemplary hinge assembly with an inductor pair according to embodiments of the present invention.
Figure 3B:
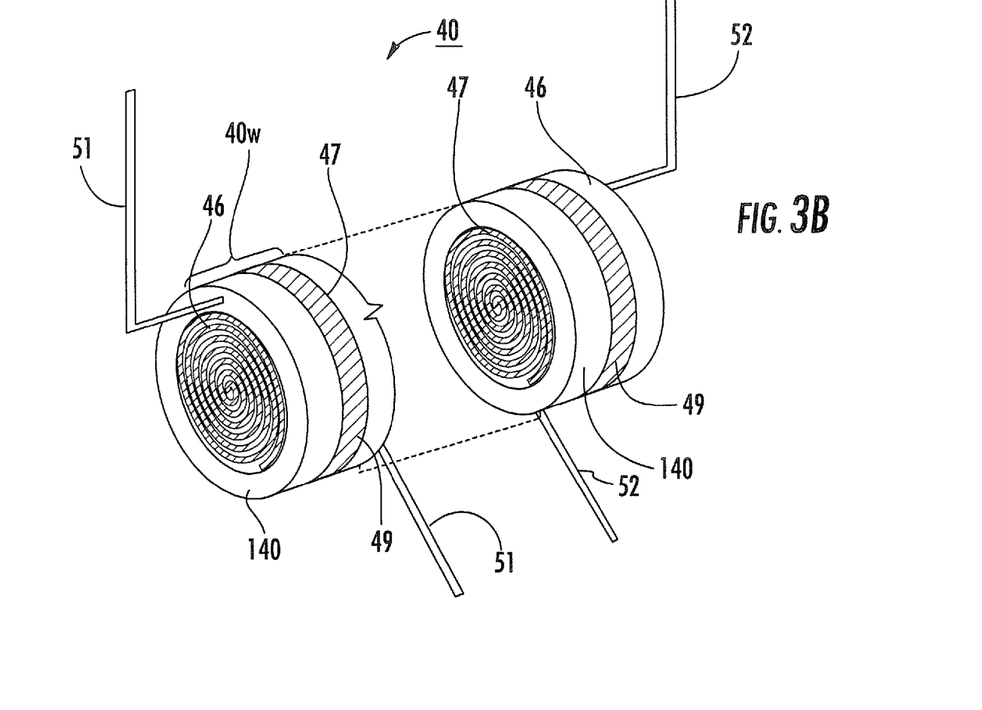
FIG. 3B is an enlarged partial schematic of another hinge configuration according to embodiments of the present invention.

As shown in FIG. 3A (with the outer wall 40w of the hinge cavity cutaway), the hinge assembly 40 can include a rod 40r that extends through a center portion of the first and second inductors 46, 47. The assembly 40 can include a non-conductive inner ring, sleeve and/or coating that resides on or over the rod 40r between the rod 40r and the wires forming the center of the inductor coils 46, 47. The assembly 40 can also include a non-conductive outer layer or member 140, shown as an outer non-conductive sleeve or ring, or other outer member that holds and/or contacts the coils 46, 47. The coil(s) 46, 47 can slide onto the rod 40r as a sub assembly or separately and the coils can snugly rest against the rod in slight expansion. The outer sleeve 140 can facilitate easier assembly into position and can provide suitable alignment. In some embodiments, the rod 40r can be metallic. In other embodiments, the rod 40r is non-conductive and there is no need for an inner ring or sleeve 142. As shown in FIG. 3A, the rod 40r of the hinge 40 can extend laterally across the first and second members through the center portion of the hinge cavity and through the coils 46, 47. The inductors 46, 47 forming the inductor pairs can be closely spaced with a thin dielectric 49 therebetween. FIG. 3B illustrates that the coils 46, 47 can be allowed to expand to the size of the non-conductive outer sleeve 140 (or even just the inner wall of the hinge cavity) and can reside in the hinge cavity and are not required to be held by a rod 40r.

The circuits 24, 34 can include a communications coupling drive circuit. In some embodiments, the circuits 24, 34 may include a serial communications coupling circuit 24c, 34c which refers to the circuit that couples and drives the serial transmission/receive paths 51, 52 for data transfer between components on two different members, e.g., the base and flip members. Typically, the wireless terminal 10 will include a serial communications coupling circuit 24c, 34c on both of the members 20, 30, e.g., the base and the flip members. The serial communications coupling circuits 24c, 34c may in some embodiments comprise a CMOS driven and/or based low power circuit with electronic components that couple at least one corresponding transmission (Tx) and receive (Rx) path(s) 51 in the two members 20, 30 and a corresponding electrical coupler 45 transmits data and is typically grounded through the hinge assembly 40. In some embodiments, the circuits 24c, 34c may modulate current (e.g., amplify a received digital signal) through the coil(s) in response to data to be transmitted.

Figure 4A:
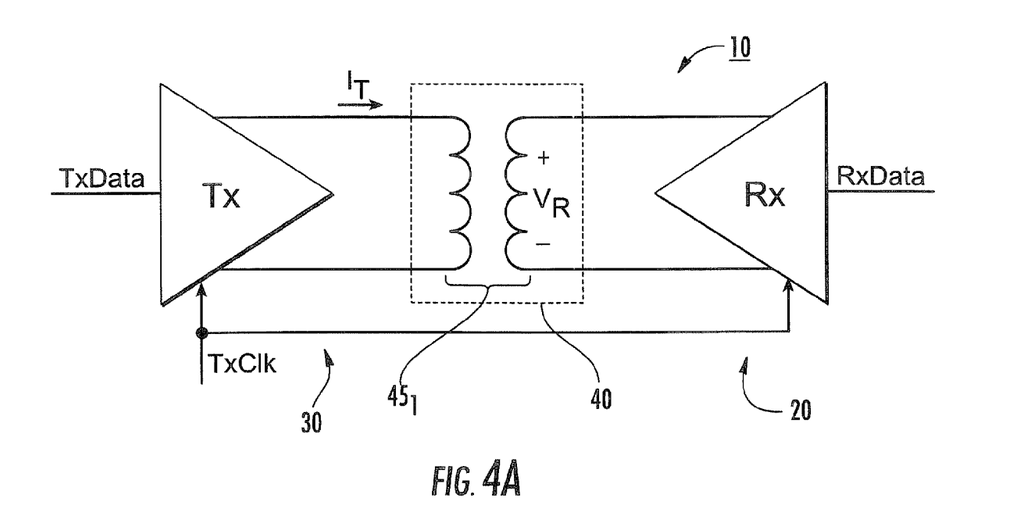
FIG. 4A is a circuit diagram of an exemplary CMOS circuit according to embodiments of the present invention.
Figure 4B:
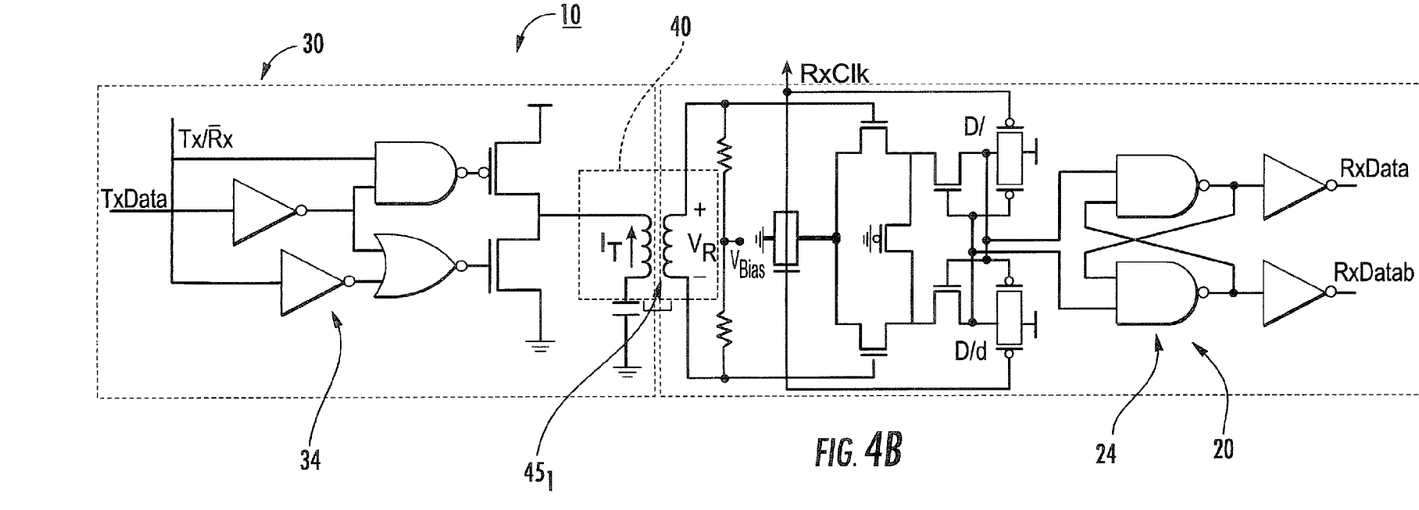
FIG. 4B is a circuit diagram of another exemplary CMOS based data transfer circuit.

FIGS. 4A and 4B are partial schematics of digital CMOS circuit diagrams that can provide one or more inductive couplings for the corresponding one or more serial data paths, shown as one data path 51. As shown in FIG. 4B, the wireless terminal 10 can include CMOS circuit components 24, 34, some of which are on/on the first member 20, some of which reside in the second member 30 and some of which reside in the hinge assembly 40 (as indicated by the broken line boxes). FIGS. 4A and 4B only illustrate one coupler $45_1$. As will be known to those of skill in the art, this exemplary circuit diagram can be duplicated for the one or more additional serial paths and/or some of the transmit or receive circuit components may be shared with an additional coupler $45_2$ being added along with another serial path 52. As noted above, although illustrated with respect to CMOS circuitry, the present invention is not limited thereto as any suitable serial interface circuit can be used.

Figure 6A:
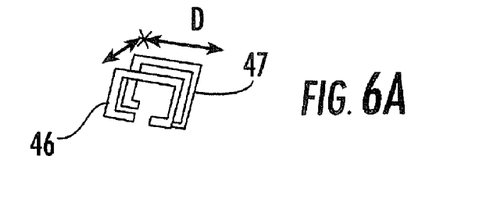
FIGS. 6A-6C are schematic illustrations of inductive coupling configurations according to embodiments of the present invention.
Figure 6B:
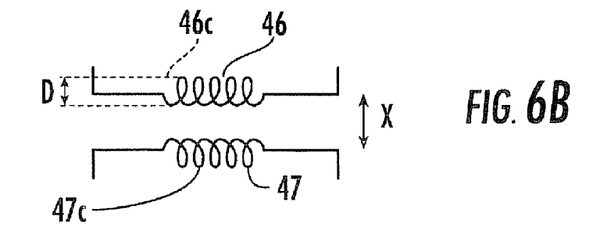
Figure 6C:
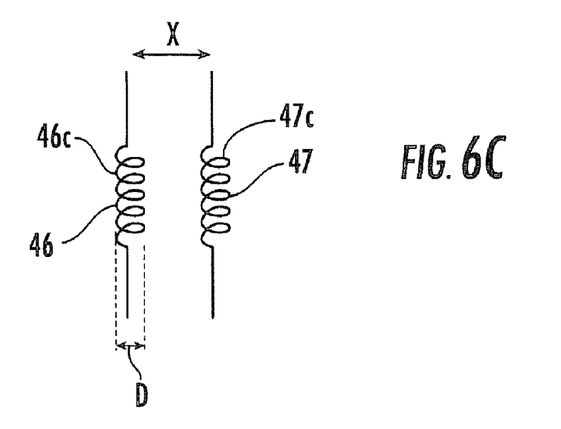

FIGS. 6A-6C illustrate that the inductor pairs 46, 47 can have a diameter or distance "D" and the pairs can be closely spaced with spacing "X". FIG. 6A illustrates that the inductor "coil" can be a flat CMOS wafer or substrate. FIGS. 6B and 6C illustrate that the coil pairs are arranged to be substantially parallel for efficient data transfer, but the orientation may be different depending on the hinge configuration and form factor desired. That is, the inductors 46, 47 may be oriented to be substantially vertical (FIG. 6C) or substantially horizontal (FIG. 6B). The inductor pairs of one coupler $45_1$ can be configured and/or oriented differently from the inductor pair(s) of the other $45_2$. The inductors 46, 47 can be provided as discrete coil components or may be held in a wafer, chip or other suitable substrate or component. As shown, the cooperating pairs of coils 46c, 47c can have a "D" of between about 1 μm to about 10 mm and a close separation distance "X" of between about 1 μm to about 10 mm to support the desired data transfer rate. In some embodiments, the coils can have a diameter and/or size "D" that substantially matches the diameter of the hinge to maximize the coil size. The inductive couplers can be configured to provide a high-speed data transfer rate that is typically between about 0.1 Gigabyte/second to about 1000 Gigabytes/second (on average). For more discussion of CMOS See, Tadahiro Kuroda, *CMOS Proximity Wireless Communications for 3D Integration*, EE 290c, Spring 2007, Depart of EECS University of California, Berkeley, at URL http bwrc.eecs.Berkeley.edu/Classes/ee290c_s07, particularly, pages 17, 29-31, the contents of which are hereby incorporated by reference as if recited in full herein. A maximum data rate per channel may be based, inter alia, on communication or data transfer distance "X" and diameter "D".

Figure 7:
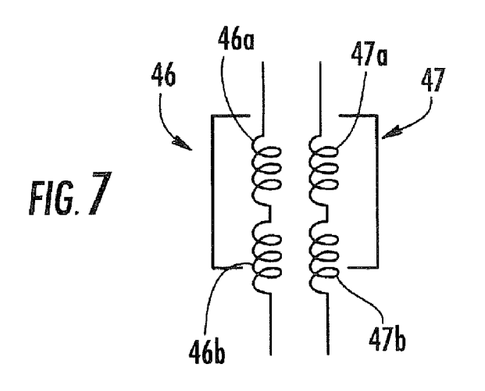
FIG. 7 is a schematic of a multi-inductor configuration according to embodiments of the present invention.

As schematically shown in FIG. 7, each side of the coupling $45_1$, $45_2$, can include a plurality of coils, shown as two corresponding coils 46a, 46b and 47a, 47b.

Figure 8:
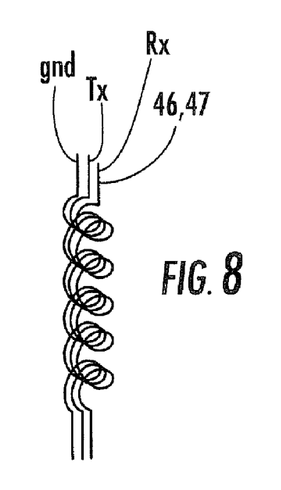
FIG. 8 is a schematic of a multi-wire inductor according to embodiments of the present invention.

As shown in FIG. 8, the coils 46, 47 can be a single wire or a multiple wire configuration. Where more than one wire is used, each can be insulated from electrical contact with the other. Where three wires are used, one wire can be for a Tx line, one for an Rx line and one for connecting to ground 70.

Figure 9:
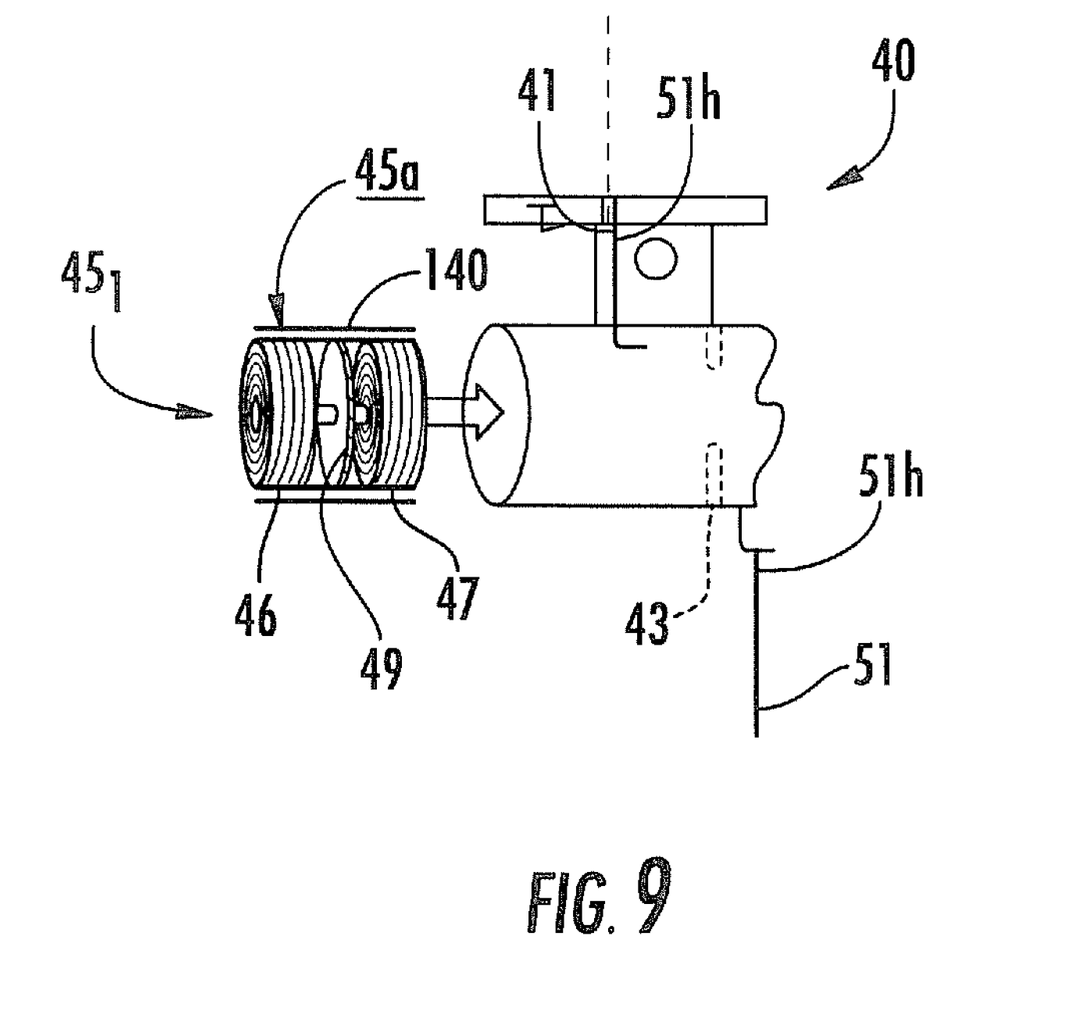
FIG. 9 is a partial enlarged schematic of a hinge assembly according to embodiments of the present invention.

In some embodiments, as shown in FIG. 9, the electrical coupler pairs $45_1$, $45_2$, can be preformed with the electronic members e.g., inductor pairs 45, 46 and dielectric 49 as a coupler assembly 45a and inserted into the desired location in the hinge assembly 40 to align with the traces 51h or 52h on the hinge connector 41 (FIG. 2). The assembly 45a may optionally include an outer non-conductive sleeve 140. The hinge assembly 40 can have an internal slide stop member 43, such as a protrusion, partition, shelf or other suitable configuration that engages the assembly 45a when properly located in the operational position in the hinge cavity. FIG. 9 illustrates that the stop 43 can be spatially located within the cavity to cause the first inductor 46 or, in other embodiments, the second inductor 47, to align to the upper hinge trace 51h and the other inductor to align with the lower hinge trace 51h, however other configurations may be used.

Although not shown, it is noted that conventional wireless terminals typically employ an antenna that is electrically connected to a transceiver operatively associated with a signal processing circuit positioned on an internally disposed printed circuit board. In order to increase the power transfer between an antenna and a transceiver, the transceiver and the antenna may be interconnected such that their respective impedances are substantially "matched," i.e., electrically tuned to compensate for undesired antenna impedance components, to provide a 50-Ohm (Ω) (or desired) impedance value at the feed point. The transceiver can be electrically connected to a controller such as a microprocessor (digital signal processor) held on the circuit board 24. The controller can be electrically connected to a speaker (not shown) that is configured to transmit a signal from the controller to a user of a wireless terminal. The controller can also electrically connected to a microphone that receives a voice signal from a user and transmits the voice signal through the controller and transceiver to a remote device. The controller can be electrically connected to the keypad 31 and display 21 that facilitate wireless terminal operation. Operation of a wireless terminal and the transceiver, controller, speaker and microphone are well known to those of skill in the art and need not be described further herein.

In the drawings and specification, there have been disclosed embodiments of the invention and, although specific terms are employed, they are used in a generic and descriptive sense only and not for purposes of limitation, the scope of the invention being set forth in the following claims. Thus, the foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A wireless terminal, comprising:
   a first housing member comprising a circuit in communication with a first serial communications data path;
   a second housing member attached to the first member, the second housing member comprising a first serial communications data path; and
   a hinge assembly attached to the first and second housing members to allow the first and second housing members to pivot between open and closed configurations, wherein the hinge assembly comprises a first electrical coupler that couples the first serial communications data path in the first housing member to the first serial communications data path in the second housing member to allow serial communications data transfer therebetween,
   wherein the first electrical coupler is configured to provide high-speed data transfer at a rate of at least about 0.1 Gigabyte/second between transmit and receive components in the first and second housing members,
   wherein the first electrical coupler comprises first and second electronic members in a closely spaced apart cooperating relationship to define a data transfer coupling between the first communications data paths of the first and second housing members,
   wherein the first and second electronic members of the first electrical coupler comprise first and second cooperating inductors that define a respective inductor pair configured to inductively couple the first member first data path to the second member first data path, and wherein the inductors of the inductor pair in the hinge assembly have a diameter of between about 1 μm to about 10 mm and a spacing of between about 1 μm to about 10 mm with a dielectric therebetween,
   wherein the hinge assembly includes a hinge with a cavity, and wherein the hinge assembly comprises a laterally extending rod that allows the first and second members to pivot between the open and closed positions, and wherein the rod extends through a center portion of closely spaced coils of the first and second inductors, wherein a non-conductive material resides between the rod and the first and second inductor coils, and wherein a thin dielectric material resides laterally between adjacent ends of the closely spaced first and second inductor coils, and wherein the hinge assembly further comprises an outer sleeve sized and configured to receive the rod and the first and second inductor coils, the sleeve being sized and configured to slidably enter the hinge cavity, the hinge cavity having an internal slide stop member that engages the sleeve to help place the inductors in position inside the hinge cavity and aligned with electrical traces.

2. A wireless terminal according to claim 1, wherein the first housing member circuit comprises a serial to parallel conversion circuit in communication with the first serial communications data path.

3. A wireless terminal according to claim 1, wherein the first and second housing members comprise a respective second serial communications data path, and wherein the hinge assembly comprises a second electrical coupler laterally spaced apart from the first electrical coupler that allows data transfer between the second serial communications data paths in the first and second housing members, and wherein the second electrical coupler comprises first and second electronic members in a closely spaced apart cooperating relationship to define an inductive, resistive, or capacitive data transfer coupling between the second communications data paths of the first and second housing members.

4. A wireless terminal according to claim 3, wherein the first and second electronic members of the second electrical coupler comprise a first inductor and a cooperating closely spaced apart second inductor separated by a dielectric, and wherein the hinge assembly defines a ground for each of the first and second electrical couplers whereby the first and second inductors for each of the first and second electrical couplers define an inductor pair that allows inductive data transfer, and wherein the cooperating first and second inductors of the second electrical coupler in the hinge assembly have a diameter of between about 1 μm to about 10 mm and a spacing of between about 1 μm to about 10 mm with a dielectric therebetween.

5. A wireless terminal according to claim 1, wherein the first and second housing members include a data path circuit with a CMOS circuit that drives the data transfer in the first serial communications data paths between the first and second housing members.

6. A wireless terminal according to claim 1, wherein the first housing member first serial communication data path extends downwardly from a first serial communications circuit into upper and lower hinge assembly traces, the upper hinge assembly trace in communication with the first serial communications data path in the first housing member and extending to an upper portion of the first inductor, the lower hinge traces extending from a lower portion of the second inductor to be in communication with the first serial communications data path in the second housing member.

7. A wireless terminal according to claim 6, wherein the first member is the base member of a portable radiotelephone and the second member is a flip member thereof, wherein the flip member first serial communications data path electrically connects to a serial to parallel conversion circuit in the base member through the first electrical coupler in the hinge assembly and the first serial communication data path in the base member, and wherein the hinge assembly defines an electrical ground in electrical communication with one inductor of the inductor pair.

8. A wireless terminal according to claim 1, wherein the first and second inductors comprise a plurality of wires, at least one wire for a transmit line and at least one for a receive line.

9. A wireless terminal according to claim 1, wherein at least one inductor of the inductor pair comprises a wire in communication with a ground defined by the hinge assembly and another that is in communication with a transmit and receive line in at least one of the first or second housing member.

10. A wireless terminal, comprising:
    a first housing member comprising a circuit in communication with a first serial communications data path;
    a second housing member attached to the first member, the second housing member comprising a first serial communications data path; and
    a hinge assembly attached to the first and second housing members to allow the first and second housing members to pivot between open and closed configurations, wherein the hinge assembly comprises a first electrical coupler that couples the first serial communications data path in the first housing member to the first serial communications data path in the second housing member to allow serial communications data transfer therebetween, wherein the first electrical coupler comprises at least a first and second cooperating inductor that define a respective inductor pair configured to inductively couple the first member first data path to the second member first data path, wherein the hinge assembly comprises a laterally extending rod that allows the first and second member to pivot between the open and closed positions, and wherein the rod extends through a center portion of closely spaced coils of the first and second inductors, wherein a non-conductive material resides between the rod and the first and second inductor coils, and wherein a thin dielectric material resides laterally between adjacent ends of the closely spaced first and second inductor coils.

11. A wireless terminal comprising:

a first housing member comprising at least one communications data path;

a second housing member attached to the first member, the second housing member comprising at least one communications data path; and a hinge assembly attached to the first and second housing members to allow the first and second housing members to pivot between open and closed configurations, wherein the hinge assembly is configured with at least one cooperating inductor pair that inductively couples corresponding communications data paths in the first and second housing members whereby the inductive coupling allows communications data transfer between the at least one communications data paths in the first and second housing members, wherein the at least one cooperating pair of inductors in the hinge assembly have a diameter of between about 1 µm to about 10 mm and a spacing of between about 1 µm to about 10 mm with a dielectric therebetween, wherein the hinge assembly includes a hinge with a cavity, and wherein the hinge assembly comprises a laterally extending rod that allows the first and second members to pivot between the open and closed positions, and wherein the rod extends through a center portion of closely spaced coils of the at least one inductor pair, wherein a non-conductive material resides between the rod and first and second inductor coils associated with the at least one inductor pair, and wherein a thin dielectric material resides laterally between adjacent ends of the closely spaced first and second inductor coils, and wherein the hinge assembly further comprises an outer sleeve sized and configured to receive the rod and the first and second inductor coils, the sleeve being sized and configured to slidably enter the hinge cavity, the hinge cavity having member that engages the sleeve to help place the inductors in position inside the hinge cavity and aligned with electrical traces.

12. A wireless terminal according to claim 11, wherein the first and second housing members at least one communications data path each comprises corresponding first and second serial communications data paths, the first and second housing members also each comprising a serial to parallel CMOS conversion circuit in communication with respective first and second serial communications data paths, wherein the inductive coupling allows serial data transfer between the corresponding first and second communications data paths.

13. A wireless terminal according to claim 12, wherein the at least one cooperating pair of inductors in the hinge assembly includes a first cooperating pair of inductors and a laterally spaced apart second cooperating pair of inductors, one inductor pair for each of the first and second serial communications data paths, and wherein the inductors of the first and second inductor pairs comprise a plurality of wires, at least one wire for a transmit line and at least one for a receive line.

* * * * *

Disclaimer

7,966,047 B2 — Albert C. Seier, Walnutport, PA (US). ADVISORY ALERT OF LOW SIGNAL STRENGTH FOR CELL PHONE USER. Patent dated August 9, 2011. Disclaimer filed March 24, 2011, by the assignee, Agere Systems, Inc.

The term of this patent shall not extend beyond the expiration date of Pat. No. 7,412,263.

(*Official Gazette September 6, 2011*)

UNITED STATES PATENT AND TRADEMARK OFFICE
CERTIFICATE OF CORRECTION

| | | |
|---|---|---|
| PATENT NO. | : 7,966,047 B2 | Page 1 of 1 |
| APPLICATION NO. | : 11/761539 | |
| DATED | : June 21, 2011 | |
| INVENTOR(S) | : Demuynck | |

It is certified that error appears in the above-identified patent and that said Letters Patent is hereby corrected as shown below:

In the Claims:
Column 12, Claim 11, Line 16: Please correct "having member"
               to read -- having an internal slide stop member --

Signed and Sealed this
Eleventh Day of October, 2011

David J. Kappos
*Director of the United States Patent and Trademark Office*